United States Patent
Hussein

(10) Patent No.: US 7,449,208 B2
(45) Date of Patent: Nov. 11, 2008

(54) POURABLE DESSERT LIQUID PRODUCT

(75) Inventor: Ahmed Hussein, Niagara Falls (CA)

(73) Assignee: Rich Products Corporation, Buffalo, NY (US)

( * ) Notice: Subject to any disclaimer, the term of this patent is extended or adjusted under 35 U.S.C. 154(b) by 0 days.

(21) Appl. No.: 10/443,085

(22) Filed: May 22, 2003

(65) Prior Publication Data

US 2003/0207016 A1 Nov. 6, 2003

Related U.S. Application Data

(63) Continuation of application No. 09/774,647, filed on Feb. 1, 2001, now Pat. No. 6,569,485, which is a continuation of application No. 09/044,615, filed on Mar. 19, 1998, now Pat. No. 6,197,362.

(60) Provisional application No. 60/041,014, filed on Mar. 19, 1997.

(51) Int. Cl.
A23C 23/00 (2006.01)
(52) U.S. Cl. .................... 426/564; 426/570
(58) Field of Classification Search ................ 426/564, 426/570, 565, 585
See application file for complete search history.

(56) References Cited

U.S. PATENT DOCUMENTS

| | | | |
|---|---|---|---|
| 2,970,918 A | 2/1961 | Petersen | |
| 3,510,316 A | 5/1970 | Decker | |
| 3,935,325 A | 1/1976 | Gilmore et al. | |
| 4,012,533 A | 3/1977 | Jonas | 426/565 |
| 4,107,343 A | 8/1978 | Petricca | |
| 4,110,476 A | 8/1978 | Rhodes | |
| 4,146,652 A | 3/1979 | Kahn et al. | |
| 4,208,444 A * | 6/1980 | Gilmore et al. | 426/570 |
| 4,307,123 A * | 12/1981 | Bundus | 426/565 |
| 4,308,287 A | 12/1981 | Kahn et al. | |
| 4,312,891 A | 1/1982 | Eisfeldt | 426/573 |
| 4,353,932 A | 10/1982 | Bone | |
| 4,434,186 A | 2/1984 | Desia et al. | |
| 4,435,439 A | 3/1984 | Morris | |
| 4,451,492 A * | 5/1984 | Dell et al. | 426/564 |
| 4,497,841 A | 2/1985 | Wudel et al. | |
| 4,511,590 A | 4/1985 | Caldwell | |
| 4,552,773 A | 11/1985 | Kahn et al. | |
| 4,626,441 A | 12/1986 | Wolkstein | |
| 4,631,196 A | 12/1986 | Zeller | |
| 4,663,176 A | 5/1987 | Arden | 426/565 |
| 4,840,813 A | 6/1989 | Greenberg et al. | |
| 4,853,243 A | 8/1989 | Kahn et al. | |
| 5,171,602 A | 12/1992 | Martin et al. | |
| 5,358,728 A | 10/1994 | Martin et al. | |
| 5,478,587 A | 12/1995 | Mingione | 426/565 |
| 5,486,372 A | 1/1996 | Martin et al. | |
| 5,958,476 A | 9/1999 | Cain et al. | |
| 6,033,711 A | 3/2000 | Gonsalves et al. | |
| 6,197,362 B1 * | 3/2001 | Hussein | 426/585 |
| 6,569,485 B2 * | 5/2003 | Hussein | 426/585 |

FOREIGN PATENT DOCUMENTS

| | | |
|---|---|---|
| EP | 0 308 091 | 3/1989 |
| EP | 0 868 850 A1 | 10/1998 |
| EP | 0 649 599 | 4/1999 |
| JP | 3 63-279752 | 11/1988 |
| WO | 94/21138 | 9/1994 |

OTHER PUBLICATIONS

*Rich Products Corporation* vs. *Nestle Mexico, S.A. de C.V.*, Administrative Declaration of Breach of Patent 204,863, litigation brief dated Apr. 29, 2004.
http:hananproducts.com; Tres Leches Traditional Latin Dessert Mix specification Sheet. No date available yet.

* cited by examiner

*Primary Examiner*—Arthur L Corbin
(74) *Attorney, Agent, or Firm*—Kenyon & Kenyon LLP

(57) ABSTRACT

A pourable dessert liquid product comprising a protein source; fat; sweetener; stabilizer; flavoring agent; and emulsifier.

3 Claims, No Drawings

POURABLE DESSERT LIQUID PRODUCT

This application is a continuation of application Ser. No. 09/774,647, filed Feb. 1, 2001, now U.S. Pat. No. 6,569,485, which is a continuation of application Ser. No. 09/044,615, filed Mar. 19, 1998, now U.S. Pat. No. 6,197,362, which claims the benefit of Provisional Application Ser. No. 60/041,014, filed Mar. 19, 1997, which is incorporated herein by reference in its entirety.

SUMMARY OF THE INVENTION

The invention is directed to a pourable dessert liquid product comprising a dairy or non-dairy protein source, fat, sweetener, stabilizer, emulsifier, and a flavoring agent.

BACKGROUND OF THE INVENTION

Mixtures of dairy components for incorporation into food products are known in the food industry. These food products include nutritious drink mixes and dessert cakes such as a sponge cake soaked with a blend of three milks and then decorated with a topping. One such dessert product is marketed under the trade name known as "Tres Leches." The dairy mix for such dessert products is prepared through laboriously blending three milk products, i.e., whole milk, sweetened condensed milk, and evaporated milk. However, such dairy mixes are difficult to prepare and require maintaining fresh inventory of the separate components, leading to storage and sanitary problems.

It is an object of this invention to provide a pourable dessert liquid product for use in food products, which provides the creaminess, consistency and the traditional flavor of the above-described food products. It is another object of this invention to provide a pourable dessert liquid product that it is ready to use, does not require laboriously mixing different milks and thus provides a more sanitary operation, and reduces metal contamination due to the elimination of extraneous product casings. In addition, it is a further object of this invention to provide a base product that can be flavored by various flavoring agents and provides nutritional advantage, e.g., that may be formulated to have no animal fat or cholesterol but still maintains comparable levels of protein to those of the dairy equivalents. It is yet another object of this invention to provide a single pourable dessert liquid product which may be either dairy or non-dairy, is freezable, is consistent in quality and overall improves the sanitary and keeping quality since only a single liquid is used with no exposure to contamination as in the case of mixing three separate milks.

DETAILED DESCRIPTION OF THE INVENTION

The above-stated objectives and others are achieved by a pourable dessert liquid product comprising a dairy or non-dairy protein source, fat, sweetener, stabilizer, emulsifier and a flavoring agent.

The amount of the dairy or non-dairy protein source should be about 2 weight % to about 20 weight % of the product, preferably about 4 weight % to about 12 weight %. Examples of dairy protein source include dried skim milk, whey protein, and milk protein concentrate; examples of non-dairy protein source include caseinate and vegetable protein sources such as soy protein isolate, soy protein concentrate, and the like. Preferred protein sources include dried skim milk and caseinate.

The amount of fat in the product should be about 1 weight % to about 15 weight %, preferably about 4 weight % to about 12 weight %. Examples of fats include vegetable oils such as soy bean oil, sunflower oil, canola oil, modified canola oil, palm kernal oil, coconut oil, dairy fats, dairy cremes and the like. Preferred fats include vegetable oil, palm kernal oil and coconut oil.

The amount of sweetener should be about 4 weight % to about 35 weight % of the product, preferably about 10 weight % to about 25 weight %. Examples of sweeteners include sucrose, corn syrup including dextrose and high fructose corn syrup, artificial sweeteners, low or no calorie sweeteners, and the like. Preferred sweeteners include sucrose and corn syrup.

The amount of stabilizer should be about 0.01 weight % to about 2.0 weight % of the product, preferably about 0.01 weight % to about 1.0 weight %. Examples of stabilizers include carrageenan, guar gum, locust bean gum, xanthan gum, cellulose, modified cellulose, hydrocolloids, and the like. Preferred stabilizers include carrageenan.

The amount of flavoring agent should be about 0.1 weight % to about 2.0 weight % of the product, preferably about 0.2 weight % to about 0.6 weight %. Examples of flavoring agents include conventional flavoring agents such as condensed milk, vanilla, kahlua, coffee, mocha, raspberry, strawberry, citrus, fruit, liqueur flavor and the like. Preferred flavoring agents include condensed milk and vanilla.

The amount of emulsifier should be about 0.1 weight % to about 2.0 weight % of the product, preferably about 0.05 weight % to about 1 weight %. Examples of conventional emulsifiers include polysorbate such as polysorbate 60 and polysorbate 80, sodium stearyl lactylate, calcium stearyl lactylate, monoglyceride, diglyceride, hexaglycal distearyte, and the like. Preferred ingredients include polysorbate, mono or diglycerides and sodium stearyl lactylate.

It is contemplated that the pourable dessert liquid product may be incorporated into various types of other appropriate food products, such as dessert cakes, ready-to-use nutritious beverages, and any food products where condensed and/or evaporated milk is called for, such as french toast flavor, pudding, custards including extra rich custards, creme caramel, creme brulee, and the like. The pourable dessert liquid product may be mixed with various foods, liquids or flavorings, including eggs, cinnamon, coffee, cappuccino, coffee liqueur, coconut, nuts, chocolate, rum, and flavored mixes such as margarita, daiquiri, and pina colada. The food product may further comprise fruit or fruit toppings, such as strawberries, peaches, pineapples, mangoes and the like, or fruit products, such as conserves, marmalade and the like. The food product may also comprise a topping, including dairy or non-diary whipped toppings such as Better Creme®, Rich Whip® and/or On Top®, nuts such as hazelnut, coconut, cinnamon and chocolate. Dessert cakes containing the pourable dessert liquid product may be prepared by soaking a suitable cake with an appropriate amount by weight of the pourable dessert liquid mix; e.g., the dessert cake may be soaked with the pourable dessert liquid to provide a soaked cake product. Suitable cakes include but are not limited to sponge cakes, layer cakes, sheet cakes, half sheet, and quarter sheet cakes. The weight ratio of the cake to liquid ranges from 1:1 to 1:2.5 cake to liquid weight, most preferably 1:1 to 1:1.5.

The food product may be manufactured and/or packaged in group or single portions. The food product may be frozen, stored, distributed, and thawed for subsequent consumption.

The pourable dessert liquid product may be prepared by conventional methods, including regular pasteurization (LTLT, HTST), Extended Shelf Life (ESL), Ultra High Temperature (UHT) and in-container sterilization.

In one embodiment, a dry blend of materials is prepared comprising the dairy or non-dairy protein source, stabilizer, emulsifier and optional dry sweeteners. An aqueous solution comprising the dry blend added to water having a temperature between about 160 and 180° F. is prepared. Liquid sweetener may be added at this time, followed by fat and flavor components at some point during the process. The heated solution is agitated and allowed to stand between 3 and 10 minutes at this temperature. Certain types of processing may require other time and temperature amounts, such as HTST 160-180° F. for 15 to 20 seconds to provide a product which can be distributed frozen; ESL 257-280° F. for 2 to 4 seconds to provide an extended shelf life product that can be stored at refrigerated temperature; Direct or Indirect UHT 286 to 292° F. for 2 to 4 seconds to provide a product which can be distributed at ambient temperature. The aqueous solution is then homogenized between about 500 and 2500 psi. The solution is cooled to about 33 to 45° F. The resulting product may then be packaged and frozen, refrigerated or stored at room temperature depending on the process used to make the product.

Non-limiting examples of the invention are provided below.

EXAMPLE 1

Formulation of Non-Dairy Pourable Dessert Liquid Mix

| Ingredient | Formulation | Usage/lb | Mixing procedure |
|---|---|---|---|
| Water | 42.00 | 4200.00 | Meter in hot water (120-150° F.) |
| Drew Pone 60 | 0.20 | 20.00 | Add Drew pone |
| Premix | | 0.00 | |
| Sodium Caseinate | 3.00 | 300.00 | Add premix and disperse |
| Salt Regular | 0.04 | 4.00 | Start heating to 165° F. |
| Dipotassium Phosphate | 0.30 | 30.00 | |
| Sodium Acid Phosphate | 0.02 | 2.00 | |
| Emplex (Flakes) | 0.00 | 0.00 | |
| Mono & Diglycerides | 0.30 | 30.00 | |
| Cir Beta Carotene Dry | 0.0005 | 0.05 | |
| Carrageenan | 0.0300 | 3.00 | |
| Guar Gum | 0.0000 | 0.00 | |
| Sugar granulated | 9.00 | 900.00 | |
| | | 0.00 | |
| Corn Syrup 36DE/43 | 28.00 | 2800.00 | Meter in Corn syrup |
| Dextrose | 0.00 | 0.00 | and hold at 165° F. for 5 minutes |
| Water | 8.89 | 889.00 | Add cold water |
| Oil Palm Kernel | 8.00 | 800.00 | Add palm oil |
| Cond. Milk Flvr | 0.20 | 20.00 | Add the flavors |
| Vanilla shade | 0.02 | 2.00 | Homogenize at 500/2500 psi |
| Total per formula | 100.00 | 10000.05 | Cool to 33 to 41° F. |

EXAMPLE 2

Formulation of Diary Pourable Dessert Liquid Product

| Ingredient | Formulation | Usage/lb | Mixing procedure |
|---|---|---|---|
| Water | 42.00 | 2100.00 | Meter in hot water (120-150° F.) |
| Drew Pone 60 | 0.20 | 10.00 | Add Drew pone |
| Premix | | 0.00 | |
| Non Fat Dry Milk | 8.00 | 400.00 | Add premix and disperse |
| Salt Regular | 0.04 | 2.00 | Start heating to 165° F. |
| Dipotassium Phosphate | 0.30 | 15.00 | |
| Sodium Acid Phosphate | 0.02 | 1.00 | |
| Mono & Diglycerides | 0.30 | 15.00 | |
| Cir Beta Carotene Dry | 0.0005 | 0.03 | |
| Carrageenan | 0.0300 | 1.50 | |
| Sugar granulated | 14.00 | 700.00 | |
| Corn Syrup 36DE/43 | 5.00 | 250.00 | Meter in Corn syrup and hold at 165° F. for 5 minutes |
| Water | 21.70 | 1085.23 | Add cold water |
| Palm Oil Kernel | 8.00 | 400.00 | Add palm oil |
| Cond. Milk Flvr | 0.30 | 30.00 | Add the flavors |
| Vanilla shade | 0.01 | .25 | Homogenize at 500/2500 psi |
| Total per formula | 100.00 | 5000.00 | Cool to 33 to 41° F. |

The invention claimed is:

1. A ready-to-use liquid dessert composition comprising:
   about 2 to 20 wt % of a protein source;
   about 1 to 15 wt % of fat;
   about 4 to 35 wt % of sweetener; and
   about 0.01 to 2 wt % of stabilizer
   wherein the composition produces an unstable foam when whipped.

2. The composition of claim 1, further comprising about 0.1 to 2 wt % of emulsifier.

3. The composition of claim 2, wherein the fat includes at least two oils selected from the group consisting of vegetable oil, palm kernel oil and coconut oil.

* * * * *